US008657920B2

(12) United States Patent
Nakanishi et al.

(10) Patent No.: US 8,657,920 B2
(45) Date of Patent: Feb. 25, 2014

(54) APPARATUS FOR PURIFYING HYDROGEN AND METHOD FOR USING THE SAME

(75) Inventors: Haruyuki Nakanishi, Susono (JP); Norihiko Nakamura, Mishima (JP); Hidekazu Arikawa, Susono (JP); Hirofumi Fujiwara, Kariya (JP); Hidehito Kubo, Kariya (JP); Keiji Toh, Kariya (JP); Akiko Kumano, Kariya (JP); Shohei Matsumoto, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 993 days.

(21) Appl. No.: 12/756,718

(22) Filed: Apr. 8, 2010

(65) Prior Publication Data

US 2011/0300065 A1 Dec. 8, 2011

(51) Int. Cl.
*B01D 53/22* (2006.01)
*B01D 19/00* (2006.01)
*C01B 3/04* (2006.01)

(52) U.S. Cl.
USPC .................. 95/46; 95/54; 95/55; 95/56; 96/4; 96/6; 96/9; 423/658.2; 204/157.5; 204/157.52

(58) Field of Classification Search
USPC ................ 95/45, 46, 54, 55, 56; 96/4, 6, 7, 9; 423/658.2, 579; 422/186, 187; 204/157.5, 157.52
See application file for complete search history.

(56) References Cited

U.S. PATENT DOCUMENTS

| | | | | |
|---|---|---|---|---|
| 4,950,371 | A * | 8/1990 | McElroy | 95/46 |
| 7,087,211 | B2 * | 8/2006 | Balachandran et al. | 95/55 |
| 8,388,743 | B2 * | 3/2013 | Suzuki et al. | 96/6 |
| 8,475,722 | B2 * | 7/2013 | Nakanishi et al. | 204/157.52 |
| 2007/0234900 | A1 * | 10/2007 | Soloveichik et al. | 95/46 |
| 2007/0269687 | A1 * | 11/2007 | Kongmark et al. | 429/13 |
| 2008/0318095 | A1 | 12/2008 | Gil et al. | |

FOREIGN PATENT DOCUMENTS

| | | |
|---|---|---|
| GB | 2 310 865 A | 9/1997 |
| JP | A-9-241001 | 9/1997 |
| JP | A 2002-128512 | 5/2002 |
| JP | A 2004-008971 | 1/2004 |

(Continued)

OTHER PUBLICATIONS

International Search Report dated Nov. 8, 2011 issued in International Application No. PCT/JP2011/068634 (with translation).

(Continued)

*Primary Examiner* — Jason M Greene
(74) *Attorney, Agent, or Firm* — Oliff PLC

(57) ABSTRACT

An apparatus and method purify hydrogen from a mixed fluid containing gaseous hydrogen, gaseous oxygen, and liquid water. The apparatus has a mixed fluid channel through which the mixed fluid flows; a first gas channel through which a mixed gas containing gaseous hydrogen and gaseous oxygen flows; a second gas channel through which gaseous hydrogen or oxygen flows; a gas-liquid separating membrane forming a wall between the mixed fluid channel and the first gas channel, separating the mixed gas from the mixed fluid of the mixed fluid channel, and providing the separated mixed gas to the first gas channel; and a hydrogen or oxygen separating membrane forming a wall between the first gas channel and the second gas channel, separating gaseous hydrogen or oxygen from the mixed gas of the first gas channel, and providing the separated gaseous hydrogen or oxygen to the second gas channel.

7 Claims, 4 Drawing Sheets

(56) References Cited

FOREIGN PATENT DOCUMENTS

| | | |
|---|---|---|
| JP | A 2004-035356 | 2/2004 |
| JP | A 2004-292284 | 10/2004 |
| JP | A 2005-319383 | 11/2005 |
| JP | A 2006-290686 | 10/2006 |
| JP | A 2008-055295 | 3/2008 |
| JP | A-2008-524101 | 7/2008 |
| JP | A 2008-207969 | 9/2008 |
| JP | A-2008-285756 | 11/2008 |
| JP | A-2009-195809 | 9/2009 |
| WO | WO 2006/064311 A1 | 6/2006 |

OTHER PUBLICATIONS

Written Opinion dated Nov. 8, 2011 issued in International Application No. PCT/JP2011/068634 (with partial translation).

* cited by examiner

US 8,657,920 B2

APPARATUS FOR PURIFYING HYDROGEN AND METHOD FOR USING THE SAME

TECHNICAL FIELD

The present invention relates to an apparatus for purifying hydrogen, which purifies hydrogen from a mixed fluid containing gaseous hydrogen, gaseous oxygen, and liquid water. More particularly, the present invention relates to an apparatus for purifying hydrogen, which purifies hydrogen from a mixed fluid of liquid water containing gaseous hydrogen and gaseous oxygen bubbles. Further, the present invention relates to methods for using this apparatus to purify and produce hydrogen.

BACKGROUND ART

In recent years, numerous proposals have been made for use of the clean energy hydrogen as a source of energy.

To produce hydrogen, steam reformation of a hydrocarbon fuel has been the general practice. In recent years, it has been considered to obtain hydrogen from water by the splitting of water, in particular the splitting of water using solar energy. When splitting water to obtain hydrogen, the obtained product sometimes becomes a mixture of hydrogen, oxygen, and water. In this case, to obtain hydrogen, it is necessary to separate and remove only the hydrogen from this mixture.

Regarding the separation of hydrogen from such a mixture of hydrogen, oxygen, and water, Japanese Unexamined Patent Publication (Kokai) No. 2004-35356 and Japanese Unexamined Patent Publication (Kokai) No. 2004-292284 propose using a hydrogen separating membrane selectively allowing the passage of only hydrogen. Note that, Japanese Unexamined Patent Publication (Kokai) No. 2008-207969 proposes using a hydrogen separating membrane for separation of hydrogen from a mixed gas obtained by steam reformation of a hydrocarbon fuel.

SUMMARY OF INVENTION

The present invention proposes an apparatus for purifying hydrogen which efficiently purifies hydrogen from a mixed fluid containing gaseous hydrogen, gaseous oxygen, and liquid water. Further, the present invention proposes methods for using this apparatus to purify and produce hydrogen.

The apparatus for purifying hydrogen of the present invention has a mixed fluid channel through which a mixed fluid containing gaseous hydrogen, gaseous oxygen, and liquid water flows; a first gas channel adjoining the mixed fluid channel and through which a mixed gas containing gaseous hydrogen and gaseous oxygen flows; a second gas channel adjoining the first gas channel and through which gaseous hydrogen or oxygen flows; a gas-liquid separating membrane forming at least part of a wall between the mixed fluid channel and the first gas channel, separating the mixed gas from the mixed fluid of the mixed fluid channel, and providing the separated mixed gas to the first gas channel; and a hydrogen or oxygen separating membrane forming at least part of a wall between the first gas channel and the second gas channel, separating gaseous hydrogen or oxygen from the mixed gas of the first gas channel, and providing the separated gaseous hydrogen or oxygen to the second gas channel.

DESCRIPTION OF EMBODIMENTS

Figure 1:
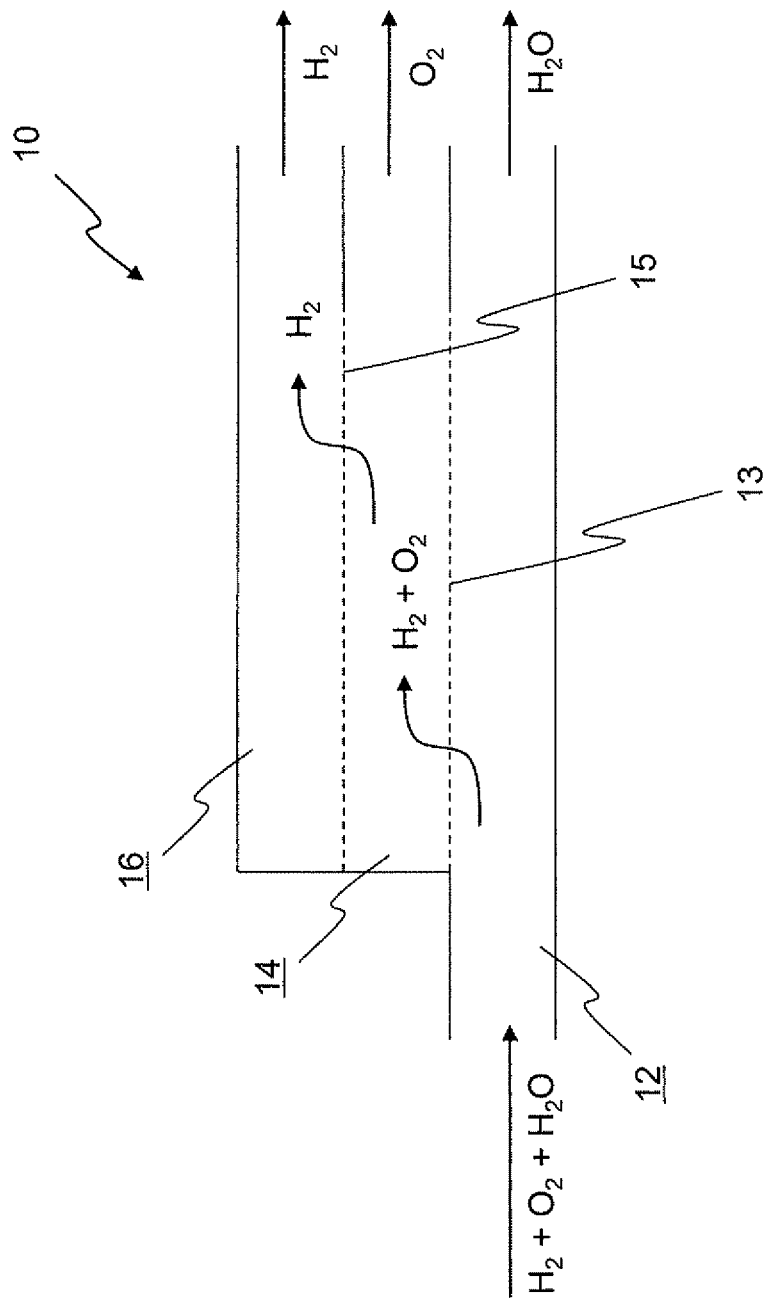
FIG. 1 is a view explaining a first aspect of the apparatus for purifying hydrogen of the present invention.

The apparatus for purifying hydrogen of the present invention is used for purifying hydrogen from a mixed fluid containing gaseous hydrogen, gaseous oxygen, and liquid water. More specifically, the apparatus for purifying hydrogen of the present invention separates a mixed gas containing gaseous hydrogen and gaseous oxygen from a mixed fluid containing gaseous hydrogen, gaseous oxygen, and liquid water by using a gas-liquid separating membrane; and separates hydrogen or oxygen from this mixed gas by using a hydrogen or oxygen separating membrane to obtain the hydrogen. The mixed fluid containing gaseous hydrogen, gaseous oxygen, and liquid water can be obtained by splitting of water, in particular by electrolysis of water. Further, this mixed fluid, for example, is liquid water containing gaseous hydrogen and gaseous oxygen bubbles.

According to the apparatus for purifying hydrogen of the present invention, before using a hydrogen or oxygen separating membrane to separate hydrogen or oxygen from the mixed gas containing gaseous hydrogen and gaseous oxygen, a gas-liquid separating membrane is used to separate liquid water from the mixed fluid containing gaseous hydrogen, gaseous oxygen, and liquid water. According to this, the formation of a film of water on the hydrogen or oxygen separating membrane can be suppressed, and thereby a drop in the hydrogen or oxygen separating efficiency due to the film of water on the hydrogen or oxygen separating membrane can be suppressed.

In a mixed fluid containing gaseous hydrogen, gaseous oxygen, and liquid water, due to the difference in specific gravity, the gaseous hydrogen and gaseous oxygen are present in relatively larger amounts at the vertical top. Therefore, it is preferable, for promoting the separation of the mixed gas by the gas-liquid separating membrane, that at least part of the gas-liquid separating membrane forms at least part of the vertical upper wall of the mixed fluid channel.

In order for the apparatus for purifying hydrogen of the present invention to achieve separation of hydrogen, it is possible to make the pressure of the mixed fluid channel greater than the pressure of the first gas channel, and to make the pressure of the first gas channel greater than the pressure of the second gas channel. The specific pressure depends on the operating temperature of the apparatus for purifying hydrogen of the present invention, the separation performance and strength of the membrane used, etc. For example, it is particularly preferable to make the pressure of the mixed fluid channel 1 atm or more, to make the pressure of the first gas channel less than 1 atm to 0.01 atm, and to make the partial pressure of the hydrogen or oxygen to be separated by the hydrogen or oxygen separating membrane in the second gas channel a pressure smaller than the partial pressure of the hydrogen or oxygen in the first gas channel.

Further, before purifying the hydrogen by the apparatus for purifying hydrogen of the present invention, another apparatus may be used to extract a part of the hydrogen and/or oxygen from the mixed fluid in advance. Furthermore, after purifying the hydrogen by the apparatus for purifying hydrogen of the present invention, another apparatus may be used to extract a part of the remaining hydrogen and/or oxygen from the mixed fluid. In this case, as the other apparatus for purifying hydrogen, a container-type gas-liquid separation system utilizing gravity, centrifugal force, etc. may be used.

Note that, the mixed fluid after treatment by the apparatus for purifying hydrogen of the present invention and any other apparatus is substantially comprised of water, and therefore can be discarded and/or can be split again to obtain a mixed fluid containing gaseous hydrogen, gaseous oxygen, and liquid water.

As the "gas-liquid separating membrane" able to be used in the present invention, it is possible to use any membrane able to selectively allow the passage the gas component of gaseous hydrogen and gaseous oxygen from a mixed fluid containing gaseous hydrogen, gaseous oxygen, and liquid water. The molar ratio $\{(H_2+O_2)/H_2O\}$ of the amount of passage of gaseous hydrogen and gaseous oxygen and the amount of passage of liquid water may be, for example, at the operating temperature, 2 or more, 10 or more, 50 or more, 100 or more, or 1,000 or more.

As such a gas-liquid separating membrane, many membranes are known. For example, a porous ceramic body having a water repellent coating thereon may be used. Further, use of a porous ceramic body, metal mesh, or other permeable support which is laminated with the gas-liquid separating membrane is sometimes preferable in regard to strength.

As the "hydrogen separating membrane" used in the present invention, it is possible to use any membrane enabling the selective passage of hydrogen compared with oxygen from a mixed gas containing gaseous hydrogen and gaseous oxygen. The molar ratio $(H_2/O_2)$ of the amount of passage of hydrogen and the amount of passage of oxygen may be, for example, at the operating temperature, 2 or more, 10 or more, 50 or more, 100 or more, or 1,000 or more.

As such a hydrogen separating membrane, many membranes are known. For example, Japanese Unexamined Patent Publication (Kokai) No. 2008-055295, Japanese Unexamined Patent Publication (Kokai) No. 2002-128512, Japanese Unexamined Patent Publication (Kokai) No. 2004-008971, Japanese Unexamined Patent Publication (Kokai) No. 2005-319383, Japanese Unexamined Patent Publication (Kokai) No. 2006-290686, etc. may be referred to. Further, use of a porous ceramic body, metal mesh, or other permeable support which is laminated with the hydrogen separating membrane is sometimes preferable in regard to strength.

As the "oxygen separating membrane" used in the present invention, it is possible to use any membrane enabling the selective passage of oxygen compared with hydrogen from a mixed gas containing gaseous hydrogen and gaseous oxygen. The molar ratio $(O_2/H_2)$ of the amount of passage of oxygen and the amount of passage of hydrogen may be, for example, at the operating temperature, 2 or more, 10 or more, 50 or more, 100 or more, or 1,000 or more.

As an oxygen separating membrane, many membranes are known. For example, Japanese Unexamined Patent Publication (Kokai) No. 2008-062188 etc. may be referred to. As the specific oxygen separating membrane, an oxygen separating membrane comprised of a complex oxide such as $CaTiO_3$ having mixed conductivity to oxygen ions and electrons may be used. Further, use of a porous ceramic body, metal mesh, or other permeable support which is laminated with the oxygen separating membrane is sometimes preferable in regard to strength.

<First Aspect of Apparatus for Purifying Hydrogen>

The apparatus for purifying hydrogen of the present invention, in a first aspect, comprises a mixed fluid channel through which a mixed fluid containing gaseous hydrogen, gaseous oxygen, and liquid water flows; a first gas channel adjoining the mixed fluid channel and through which a mixed gas containing gaseous hydrogen and gaseous oxygen flows; a second gas channel adjoining the first gas channel and through which gaseous hydrogen flows; a gas-liquid separating membrane forming at least part of a wall between the mixed fluid channel and the first gas channel, separating the mixed gas from the mixed fluid of the mixed fluid channel, and providing the separated mixed gas to the first gas channel; and a hydrogen separating membrane forming at least part of a wall between the first gas channel and the second gas channel, separating gaseous hydrogen from the mixed gas of the first gas channel, and providing the separated gaseous hydrogen to the second gas channel.

When the first aspect of the apparatus for purifying hydrogen of the present invention is used to purify hydrogen from a mixed fluid containing gaseous hydrogen, gaseous oxygen, and liquid water, as shown in FIG. 1, this mixed fluid ($H_2+O_2+H_2O$) is supplied to the mixed fluid channel (12), the gas component ($H_2+O_2$) of this mixed fluid is separated by the gas-liquid separating membrane (13) forming at least part of the wall between the mixed fluid channel and the first gas channel, the separated gas component ($H_2+O_2$) is provided to the first gas channel (14) to be a mixed gas containing gaseous hydrogen and gaseous oxygen ($H_2+O_2$), and the hydrogen in this mixed gas ($H_2+O_2$) is separated by the hydrogen separating membrane (15) forming at least part of the wall between the first gas channel and the second gas channel to be provided to the second gas channel (16).

In this aspect, hydrogen can be obtained from the second gas channel (16). Note that, the fraction obtained from the first gas channel (14) can be, as a fraction containing a relatively large amount of oxygen, discarded recycled for further extracting hydrogen, utilized for other applications, etc.

This first aspect is preferable in the point that it recovers, as hydrogen, the gas component which has passed through the hydrogen separating membrane separating the oxygen and hydrogen, and thereby can easily reduce the amount of oxygen mixed in the obtained hydrogen.

<Second Aspect of Apparatus for Purifying Hydrogen>

In the second aspect of the apparatus for purifying hydrogen of the present invention, instead of the hydrogen separating membrane of the first aspect, an oxygen separating membrane is used. This oxygen separating membrane constitutes at least part of the wall of the first gas channel, separates gaseous oxygen from the mixed gas of the first gas channel, and provides the separated gaseous oxygen to the second gas channel.

Figure 2:
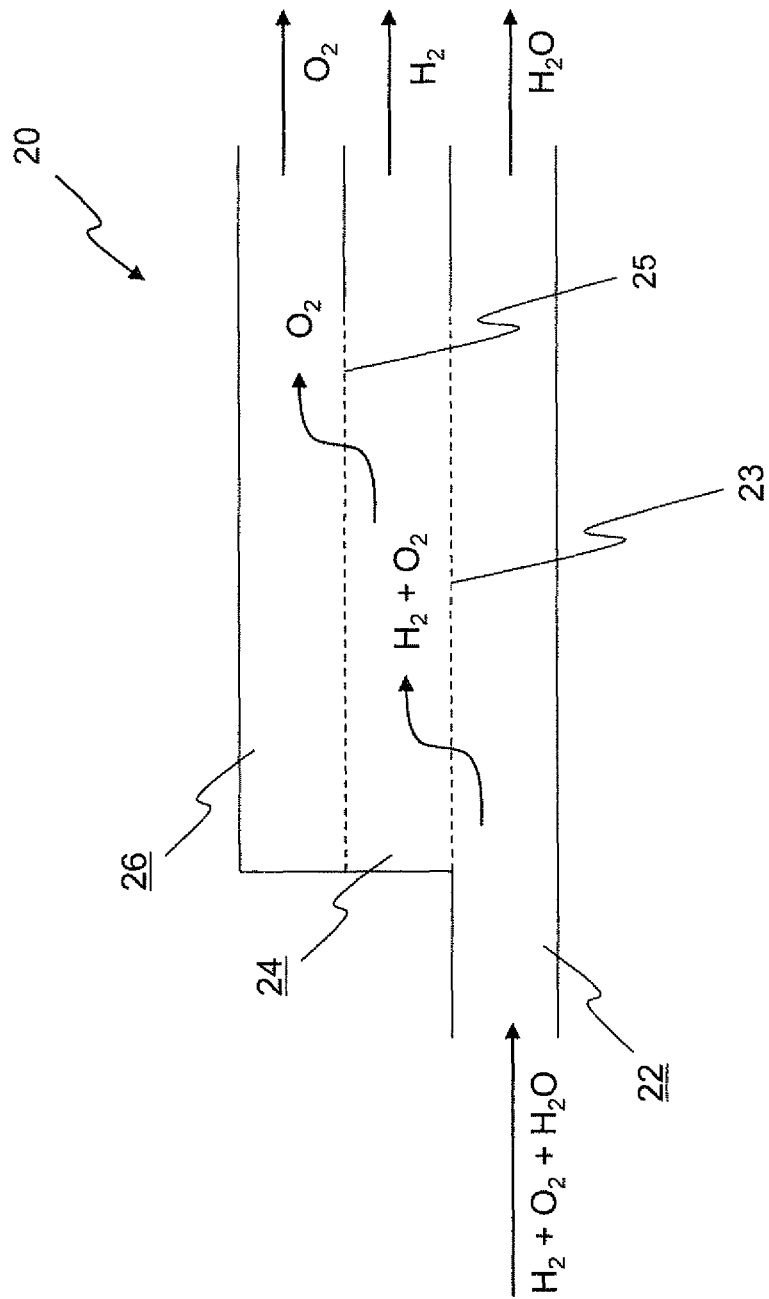
FIG. 2 is a view explaining a second aspect of the apparatus for purifying hydrogen of the present invention.

When this second aspect of the apparatus for purifying hydrogen of the present invention is used to purify hydrogen from a mixed fluid containing gaseous hydrogen, gaseous oxygen, and liquid water, as shown in FIG. 2, this mixed fluid ($H_2+O_2+H_2O$) is supplied to the mixed fluid channel (22), the gas component ($H_2+O_2$) of this mixed fluid is separated by a gas-liquid separating membrane (23) forming at least part of the wall between the mixed fluid channel and the first gas channel, the separated gas component ($H_2+O_2$) is provided to first gas channel (24) to be a mixed gas containing gaseous hydrogen and gaseous oxygen ($H_2+O_2$), and the oxygen in this mixed gas ($H_2+O_2$) is separated by an oxygen separating membrane (25) forming at least part of the wall between the first gas channel and the second gas channel to be provided to the second gas channel (26).

In this aspect, hydrogen can be obtained from the first gas channel (24). Note that, the fraction obtained from the second gas channel (26) can be, as a fraction containing a relatively large amount of oxygen, discarded, recycled for further extracting hydrogen, utilized for other applications, etc.

When a mixed fluid containing gaseous hydrogen, gaseous oxygen, and liquid water is obtained by splitting water, the theoretical molar ratio of hydrogen and oxygen becomes 2:1. Therefore, this second aspect is preferable in the point that the amount of gas to be passed through the gas separating membrane separating the oxygen and hydrogen is relatively reduced.

<Separation Promotion Mechanism>

The mixed fluid channel of the apparatus for purifying hydrogen of the present invention has a separation promotion device for promoting the separation of the gaseous hydrogen and gaseous oxygen from the liquid water. As a separation promotion device, for example, the device as shown in FIG. 3 and as shown in FIG. 4 may be used.

Figure 3:
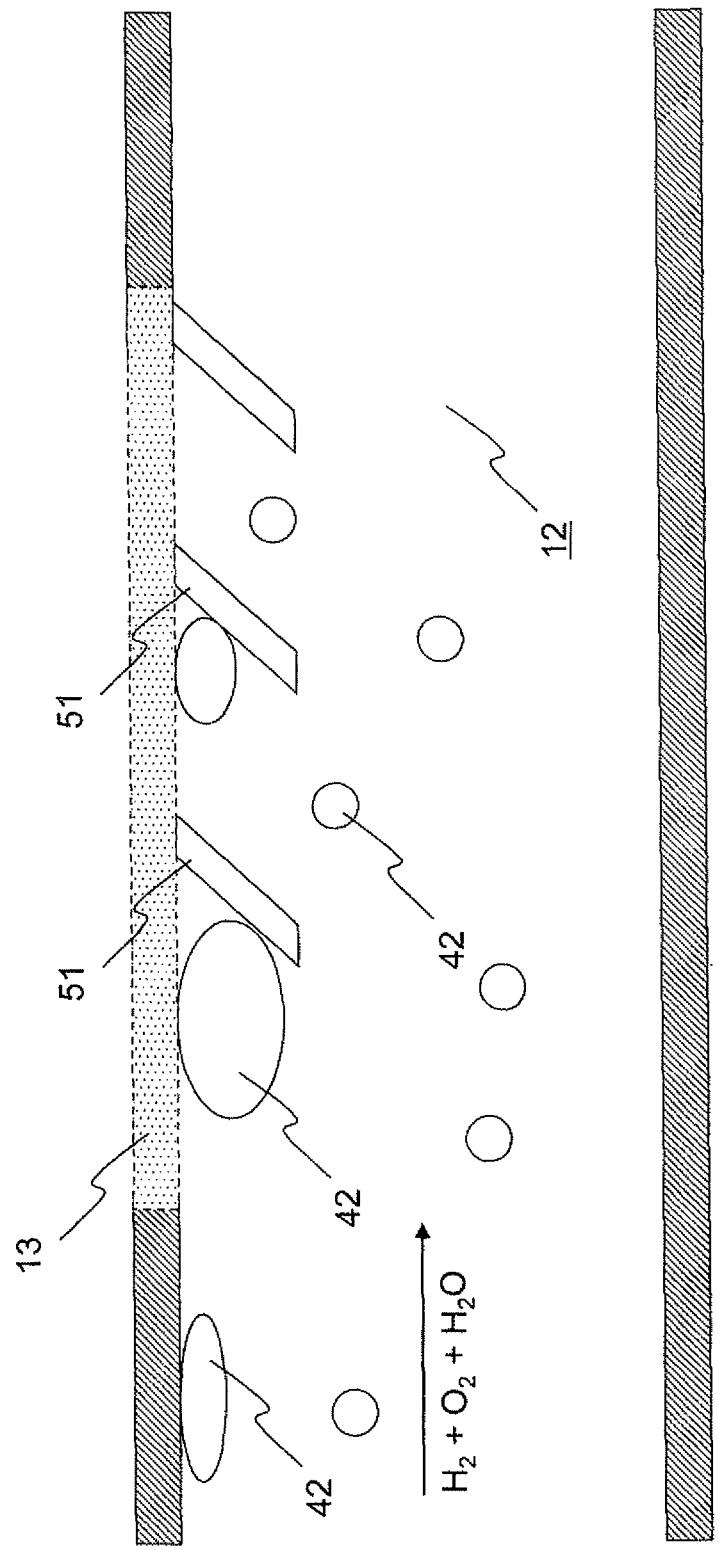
FIG. 3 is a view showing an example of a mixed fluid channel of the apparatus for purifying hydrogen of the present invention.
Figure 4:
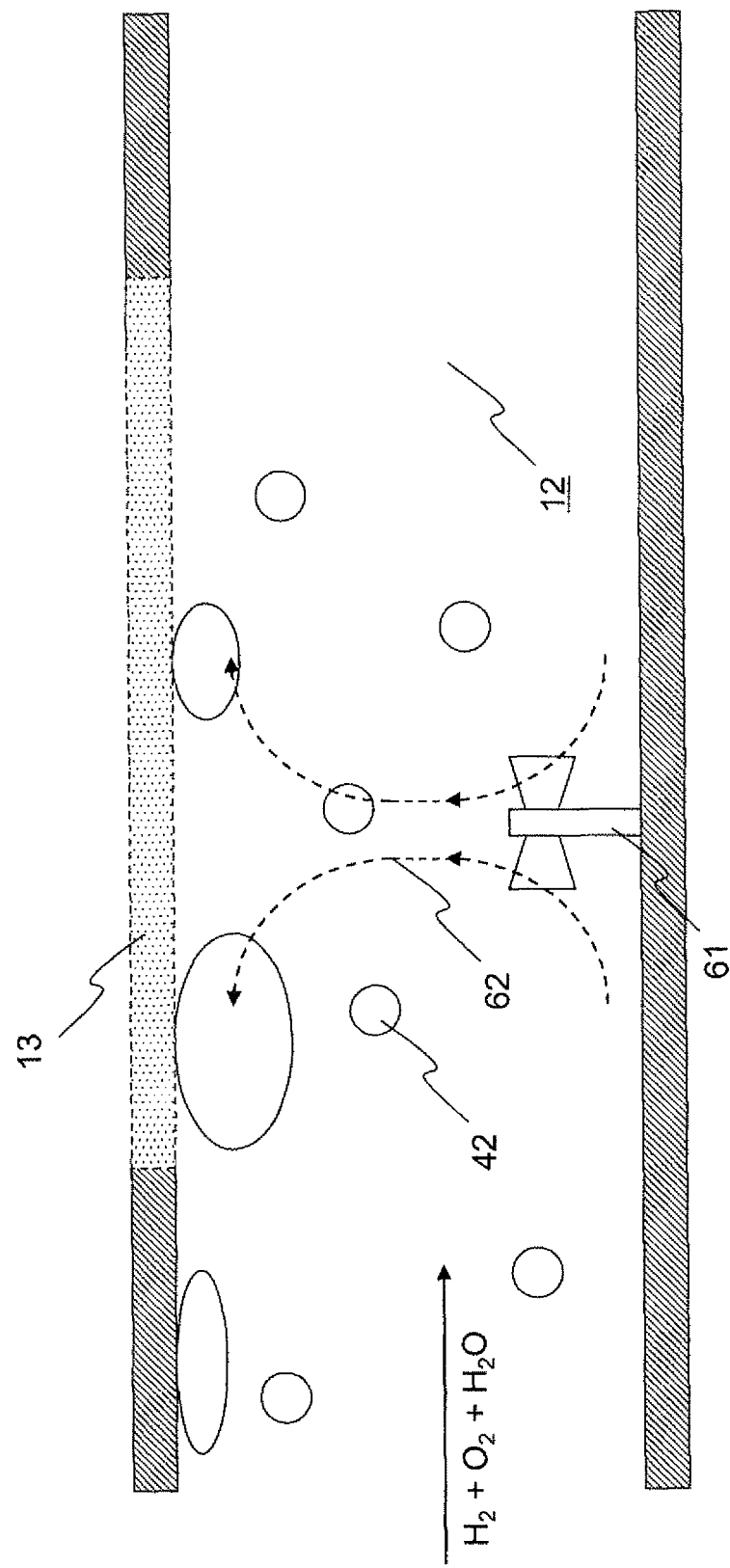
FIG. 4 is a view showing another example of a mixed fluid channel of the apparatus for purifying hydrogen of the present invention.

In the apparatus for purifying hydrogen shown in FIG. 3, at least part of the gas-liquid separating membrane (13) forms at least part of the vertical upper wall in the mixed fluid channel (12). The mixed fluid channel (12) has mixed gas trap members (51) extending from the vertical upper wall of the mixed fluid channel downward. Due to this, the mixed gas trap members (51) trap the mixed gas containing hydrogen and oxygen, in particular the bubbles (42) of this mixed gas, from the mixed fluid flowing through the mixed fluid channel, and bring the same into contact with the gas-liquid separating membrane (13).

According to the apparatus for purifying hydrogen as shown in this FIG. 3, it is possible to hold the mixed gas contained in the mixed fluid flowing through the mixed fluid channel, in particular the bubbles of the mixed gas, by the gas trap members, and reliably bring the gas-liquid separating membrane into contact with the gaseous hydrogen and gaseous oxygen, and thereby promote the separation of gaseous hydrogen and gaseous oxygen from the mixed fluid by the gas-liquid separating membrane.

This mixed gas trap members may, in particular, as shown in FIG. 3, extend downward at a slant against the direction of flow of the mixed fluid in the mixed fluid channel so as to promote the trapping of the mixed gas contained in the mixed fluid. Further, the mixed gas trap members may, in particular, extend substantially vertical to the direction of flow of the mixed fluid in the mixed fluid channel or downward at a slant in the direction of flow.

In the apparatus for purifying hydrogen shown in FIG. 4, the mixed fluid channel has a stirring device (61) stirring the mixed fluid.

According to the apparatus for purifying hydrogen which comprises the stirring device for stirring the mixed fluid, as shown in FIG. 4, it is possible to promote the contact of bubbles (42) of the mixed gas contained in the mixed fluid flowing through the mixed fluid channel (12) and the gas-liquid separating membrane (13), and thereby promote the separation of mixed gas from the mixed fluid by the gas-liquid separating membrane. Further, according to the apparatus for purifying hydrogen as shown in FIG. 4, it is possible to make bubbles contained in the mixed fluid merge to form relatively large bubbles.

This stirring device may, in particular, as shown by the arrow (62) in FIG. 4, enable the mixed fluid in the mixed fluid channel to flow toward the gas-liquid separating membrane (13) to promote the contact of bubbles (42) of the mixed gas contained in the mixed fluid to the gas-liquid separating membrane (13).

<Mixed Fluid>

The mixed fluid supplied to the apparatus for purifying hydrogen of the present invention, i.e. the mixed fluid containing gaseous hydrogen, gaseous oxygen, and liquid water, may be a mixed fluid obtained by any method. Therefore, for example, this mixed fluid may be a mixed fluid obtained by the splitting of water, in particular, direct thermal decomposition, thermochemical decomposition, or photocatalytic decomposition of water. These decomposition methods of water will be explained below.

The direct thermal decomposition of water is the most basic method for splitting water to obtain hydrogen and oxygen. It is a method of directly splitting water into hydrogen and oxygen at a high temperature of several thousands of degrees centigrade. This reaction inherently requires a temperature of several thousands of degrees centigrade, but can be achieved at a temperature of around 2,000° C. by utilizing a catalyst.

The thermochemical decomposition of water is a method combining chemical reactions to split water at a temperature lower than the case of direct thermal decomposition. The thermochemical decomposition method, in particular the thermochemical decomposition method using the oxidation-reduction reaction between a metal and a metal oxide, or the thermochemical decomposition method using an oxidation-reduction reaction between metal oxides of different oxidation states, can be scaled up. Prospects are becoming good for their practical application.

As a thermochemical decomposition method using the oxidation-reduction reaction between a metal and a metal oxide, the method of utilizing the oxidation-reduction reaction between magnesium (Mg), aluminum (Al), iron (Fe), or another metal and their metal oxides is known. Further, as a thermochemical decomposition method using an oxidation-reduction reaction between metal oxides of different oxidation states, the method of utilizing the oxidation-reduction reaction of iron oxides in different oxidation states is known. Further, as another thermochemical decomposition method, the method known as the I—S (iodine-sulfur) cycle method is known.

The method of photocatalytic decomposition of water is a method irradiating titanium oxide or another photocatalyst in contact with water with light so as to split the water into hydrogen and oxygen.

The invention claimed is:

1. An apparatus for purifying hydrogen from a mixed fluid containing gaseous hydrogen, gaseous oxygen, and liquid water, comprising:
   a mixed fluid channel through which a mixed fluid containing gaseous hydrogen, gaseous oxygen, and liquid water flows;
   a first gas channel adjoining said mixed fluid channel and through which a mixed gas containing gaseous hydrogen and gaseous oxygen flows;
   a second gas channel adjoining said first gas channel and through which gaseous hydrogen or oxygen flows;
   a gas-liquid separating membrane forming at least part of a wall between said mixed fluid channel and said first gas channel, separating said mixed gas from the mixed fluid of said mixed fluid channel, and providing said separated mixed gas to said first gas channel; and
   a hydrogen or oxygen separating membrane forming at least part of a wall between said first gas channel and said second gas channel, separating gaseous hydrogen or oxygen from the mixed gas of said first gas channel, and providing said separated gaseous hydrogen or oxygen to said second gas channel.

2. The apparatus for purifying hydrogen according to claim 1, wherein at least part of said gas-liquid separating membrane forms at least part of a vertical upper wall in said mixed fluid channel; and wherein said mixed fluid channel has mixed gas trap members extending from the vertical upper wall in said mixed fluid channel downward, and thereby said mixed gas trap members trap said mixed gas from said mixed fluid flowing through said mixed fluid channel and bring said trapped mixed fluid into contact with said gas-liquid separating membrane.

3. The apparatus for purifying hydrogen according to claim 1, wherein said mixed fluid channel has a stirring device which stirs said mixed fluid.

4. The apparatus for purifying hydrogen according to claim 1, wherein said mixed fluid channel has a pressure larger than a pressure of said first gas channel, and said first gas channel has a pressure larger than a pressure of said second gas channel.

5. The apparatus for purifying hydrogen according to claim 1, wherein at least part of said gas-liquid separating membrane forms at least part of a vertical upper wall in said mixed fluid channel.

6. A method for using an apparatus for purifying hydrogen according to claim 1 to purify hydrogen from a mixed fluid containing gaseous hydrogen, gaseous oxygen, and liquid water, comprising:

supplying said mixed fluid to said mixed fluid channel;

separating said gaseous hydrogen and gaseous oxygen in said mixed fluid of said mixed fluid channel by said gas-liquid separating membrane, and providing the separated gaseous hydrogen and gaseous oxygen to said first gas channel to obtain said mixed gas; and separating the hydrogen in said mixed gas of said first gas channel by said hydrogen separating membrane, and providing said separated hydrogen to the second gas channel, and obtaining purified hydrogen from said second gas channel; or separating the oxygen in said mixed gas of said first gas channel by said oxygen separating membrane, providing the separated oxygen to the second gas channel, and obtaining purified hydrogen from said first gas channel.

7. A method for producing hydrogen from water, comprising:

splitting water to obtain a mixed fluid containing gaseous hydrogen, gaseous oxygen, and liquid water; and using the method according to claim 6 to purify hydrogen from said mixed fluid.

* * * * *